United States Patent Office
2,708,667
Patented May 17, 1955

2,708,667

METHOD OF PREPARING AMIDES

Richard W. Young, Stamford, Conn., and Anthony J. Barbaro, New York, N. Y., assignors to American Cyanamid Company, New York, N. Y., a corporation of Maine No Drawing. Application August 9, 1951,
Serial No. 241,156

15 Claims. (Cl. 260—112)

This invention relates to a new method of preparing substituted amides and peptides.

Substituted amides and peptides may be prepared by several known methods, however these methods have not always proved satisfactory in all respects. The new method of this invention overcomes many of the difficulties of the prior art methods of preparing amides and peptides and, in addition, has many advantages over such methods.

The new method of this invention broadly comprises reacting together a dihalophosphite, a carboxylic acid and a member selected from the group consisting of amines having amine hydrogen and addition salts thereof with strong acids. This new reaction may be illustrated by the following equation:

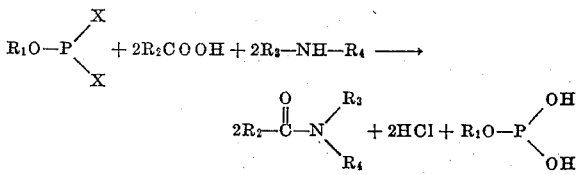

in which $R_1$ represents a hydrocarbon radical having 6 carbon atoms or less, for instance a phenyl radical or a lower alkyl radical, X represents halogen, $R_2$ represents hydrogen or a radical capable of being attached to a carboxyl group and $R_3$ represents hydrogen or an amine substituent and $R_4$ represents an amine substituent, or in other words, $R_3$—NH—$R_4$ represents a primary or secondary amine.

Dihalophosphites of the above formula are known compounds and may be prepared by known methods. Almost any dihalophosphite of the above formula in which $R_1$ represents a hydrocarbon radical having not more than 6 carbon atoms is quite satisfactory for the new process of this invention. Illustrative examples of suitable dihalophosphites are: dichlorophenylphosphite, dichloroethylphosphite, dibromoethylphosphite, dichlorobutylphosphite and dichloromethylphosphite. Dichloroethylphosphite is preferred since it is readily prepared and has an advantageous reactivity.

As will be noticed from the above equation, a halogen acid is produced in the course of the reaction. A halogen acid acceptor may, therefore, often be employed with advantageous results. If desired, a halogen acid acceptor may be employed which forms a salt with the halogen acid which is, in most instances, insoluble in the reaction acid mixture so that the resulting salt may be conveniently removed from the reaction mixture. On the other hand, halogen acid acceptors which do not ordinarily give such insoluble salts are also quite satisfactory. For instance, one may employ ethylpiperidine as a halogen acid acceptor and leave the resulting salt in the reaction mixture throughout the process. As a general rule the tertiary amines are the preferred halogen acid acceptors. Suitable tertiary amines may be illustrated by trimethylamine, dimethylphenylamine, and triethylamine.

Practically any primary or secondary amine having amine hydrogen is suitable for use in the new process of this invention and the particular amine employed depends upon the substituted amide desired. Amines which may suitably be employed in the new process may be illustrated by the following: primary aliphatic amines, for instance methylamine, ethylamine, propylamine, butylamine, hexylamine and allylamine; secondary aliphatic amines, for instance dimethylamine and dibutylamine; substituted aliphatic amines, for instance chloroethylamine, phenethylamine and benzylamine; aromatic amines, for instance aniline and naphthylamine; substituted aromatic amines, for instance m-toluidine and p-benzylaniline; secondary mixed aliphatic-aromatic amines, for instance N-allylaniline, and benzylaniline; cyclic amines, for instance piperidine, and morpholine; heterocyclic amines, for instance aminopyrimidine; diamines, for instance butylenediamine.

In place of the free amine, one may, if desired, employ addition salts of amines with strong acids although the results obtained are usually not quite so satisfactory. For instance, one may employ an amine hydrochloride in place of the free amine. If the process of this invention is performed with an amine addition salt, an additional quantity of strong acid is released into the reaction mixture. If an acid acceptor is employed, enough may be used to react with this additional acid if desired, although the reaction may be performed with an amine addition salt without the use of any acid acceptor whatsoever. Various modifications of the reaction employing an amine addition salt are illustrated in the examples to follow.

Practically any monobasic or polybasic carboxylic acid is suitable for the process of this invention. The following specific examples may be given by way of illustration: aliphatic carboxylic acids such as acetic acid, propionic acid, butyric acid, caproic acid, stearic acid, oleic acid, and the like; substituted aliphatic acids such as monochloracetic acid, and the like; polybasic acids such as succinic acid, adipic acid, and the like; aromatic acids such as benzoic, naphthalic, and the like; heterocyclic acids such as nicotinic, thiophene carboxylic, and the like; alicyclic acids such as naphthenic; etc. When dibasic acids are employed in the process, either the monoamide or the diamide may be prepared depending upon the number of molar equivalents of amine used.

The order of reaction is immaterial and the dihalophosphite may be reacted first with the carboxylic acid and this reaction product then reacted with an amine, the dihalophosphite may first be reacted with an amine and this reaction product then reacted with a carboxylic acid or the dihalophosphite may be reacted simultaneously with an amine and a carboxylic acid. In fact, the same compound may furnish both the amino group and the carboxy group although it will be obvious to those skilled in the art that under such conditions there will be a tendency for long chain polypeptide polymer formation.

As may be seen from the above, the process is very versatile and may be performed with a minimum number of manipulative steps. In addition, the process has the advantage that the dihalophosphite reagents are readily and cheaply prepared and once prepared are stable and easily purified. The process requires a comparatively small amount of the dihalophosphite reagent since this compound has two functional groups both of which are capable of entering into the desired reaction. The new process has the additional advantage that there is a minimum of side reactions and therefore the product is easily removed from the reaction mixture and obtained in a reasonably pure form. In other words, the new process permits the mild and simple preparation of sensitive materials which are readily removed from the by-products with a minimum of difficulty.

The reactions involved in the new process of this invention are not fully understood although it is believed that the amide synthesis proceeds through one or more of three possible intermediates. These three possible intermediates may be represented by the following formulae in which $R_1$, $R_2$, $R_3$ and $R_4$ are as defined above:

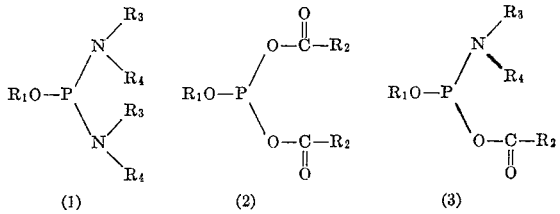

Of course, if the dihalophosphite is allowed to react first with the amine it is probable that an intermediate such as represented by Formula 1 above is formed and if the dihalophosphite is allowed to react first with the carboxylic acid it is possible that an intermediate such as (2) above is formed. If the dihalophosphite is allowed to react simultaneously with the amine and the carboxylic acid it is possible that intermediates of all three types may be formed. However, applicants do not wish their invention to be limited by chemical theory and it is intended that the invention cover the new amide synthesis regardless of the mechanisms of the chemical reactions involved.

The new procedure of this invention is especially applicable to the preparation of amides and peptides from the naturally occurring aminoacids. The procedure has the advantage that a given aminoacid may be substituted at either the carboxyl or amine group by blocking one or the other of the two groups. In other words, by the procedure of this invention one can quite readily prepare a glycylalanine derivative or an alanylglycine derivative by blocking the appropriate groups in the two aminoacids. Other naturally occurring aminoacids which may be suitably employed for making amides according to the new process of this invention may be illustrated by the following: valine, norvaline, leucine, norleucine, isoleucine, isovaline, phenylalanine, tyrosine, serine, cysteine, methionine, aspartic acid, glutamic acid, lysine, ornithine, asparagine, citrulline, histidine, tryptophane, proline, hydroxyproline, or other alpha aminoacids having one to twelve carbon atoms.

The new process of this invention may conveniently be performed in the presence of an inert solvent or diluent. The most advantageous solvents have been found to be the aromatic hydrocarbons as illustrated by benzene, toluene, and xylene. Other suitable solvents which may be employed are the aliphatic hydrocarbons, for instance pentane; cyclic ethers, for instance dioxane; chlorinated hydrocarbons, for instance chloroform and chlorobenzene and simple ethers, for instance ethyl ether. In some instances the alkyl phosphites may be advantageously employed as solvents. Such solvents may be illustrated by diethylphosphite which is a quite satisfactory solvent for the new process of this invention. It is also possible to perform the new process of this invention in the absence of a solvent or by employing an excess of one of the reagents as a solvent. If the amine and the carboxylic acid are mixed together before reaction with the dihalophosphite, they may form a salt which may be relatively insoluble in many of the above solvents, but this is not unduly detrimental since as the dihalophosphite reacts with the salt in solutiton, equilibrium is destroyed and further solution of the salt is obtained.

The reaction may be performed over a relatively wide range of temperatures, for instance from about 20° C. to 120° C. with temperatures in the range of 60° C. to 100° C. being preferred. Of course if one is working with labile compounds which are subject to decomposition at moderate temperatures, it is preferable to work with temperatures in the lower part of the operable range. The reaction is substantially complete in only a short time, for instance five to fifteen minutes at higher reaction temperatures but at lower temperatures from fifteen minutes to two hours should be allowed for complete reaction.

The invention will be more particularly illustrated by the following specific examples in which all parts are by weight unless otherwise indicated.

Example I

In 50 parts by volume of benzene there is dissolved 2.09 parts by weight of carbobenzoxyglycine and 1.01 parts by weight of triethylamine and to this solution there is added 0.73 part by weight of dichloroethylphosphite. A slight exothermic reaction occurs and the resulting precipitate of triethylamine hydrochloride is removed by filtration. To the filtered solution there is added 0.93 part by weight of aniline and this mixture heated at reflux for about 15 minutes. To this mixture there is then added 10 parts by volume of water. The organic layer is separated and then treated successively with 25 parts by volume of sodium bicarbonate, 10 parts by volume of 6N hydrochloric acid and 10 parts by volume of water. Solvent is removed by vacuum distillation and the resulting residue of carbobenzoxyglycylanilide is purified by recrystallization from alcohol-water.

Example II

Carbobenzoxyglycyl-DL-phenylalanine ethyl ester is prepared by the procedure of Example I from 2.09 parts by weight of carbobenzoxyglycine and 1.93 parts by weight of DL-phenylalanine ethyl ester.

Example III

In 35 parts by volume of benzene there is dissolved 2.09 parts of carbobenzoxyglycine and 1.01 parts of triethylamine and to this solution there is added 0.73 part of dichloroethylphosphite. The resulting precipitate of triethylamine hydrochloride is removed by filtration and to the filtered solution there is added 2.09 parts of L-tyrosine ethyl ester. This mixture is heated at reflux for about 30 minutes. The mixture is treated with 10 parts by volume of water, the organic layer separated and treated successively with 25 parts by volume of saturated sodium bicarbonate, 10 parts by volume of 6N hydrochloric acid and 10 parts by volume of water. Solvent is removed by vacuum distillation and the resulting residue to carbobenzoxyglcyl-L-tyrosine ethyl ester is purified by recrystallization from alcohol-water.

Example IV

In 50 parts by volume of benzene there is dissolved 2.05 parts of phthalylglycine and 2.02 parts of triethylamine and to this solution there is added 0.73 part of dichloroethylphosphite followed by 1.39 grams of glycine ethyl ester hydrochloride. The resulting precipitate of triethylamine hydrochloride is removed by filtration and the filtered solution is heated at reflux for about 30 minutes. The resulting phthalylglycylglycine ethyl ester is recovered by the procedure employed in Example I for the isolation and purification of carbobenzoxyglycyl-anilide.

Example V

In 35 parts by volume of dioxane there is dissolved 2.05 parts of phthalylglycine and 2.02 parts of triethylamine and to this solution there is added 0.73 part of dichloroethylphosphite followed by 1.95 parts of L-leucine ethyl ester hydrochloride. The resulting precipitate of triethylamine hydrochloride is removed by filtration and the filtered solution is warmed to about 80° C. and held at this temperature for about 30 minutes. The resulting phthalylglcyl-L-leucine ethyl ester is recovered by the procedure of Example I.

Example VI

In 70 parts by volume of benzene there is dissolved 2.65 parts of carbobenzoxy-L-leucine and 2.02 parts of triethylamine and to this solution there is added 0.73 part of dichloroethylphosphite followed by 1.96 parts of glycylglycine ethyl ester hydrochloride. The resulting precipitate of triethylamine hydrochloride is removed by filtration and the filtered solution is heated at reflux for approximately 15 minutes. The resulting carbobenzoxy-L-leucylglycylglycine ethyl ester is recovered by the procedure of Example I.

Example VII

Phthalylglycyl-L-leucine ethyl ester is prepared by the procedure of Example VI from 2.05 parts of phthalylglycine and 1.95 parts of L-leucine ethyl ester hydrochloride.

Example VIII

Carbobenzoxyglycyl-DL-phenylalanylglycine ethyl ester is prepared by the procedure of Example VI from 3.56 parts of carbobenzoxyglcycyl-DL-phenylalanine and 1.39 parts of glycine ethyl ester hydrochloride except that only 35 parts by volume of benzene solvent is employed.

Example IX

In 35 parts by volume of benzene there is dissolved 2.09 parts of carbobenzoxyglycine and 0.73 part of dichloroethylphosphite and to this solution there is added 2.29 parts of DL-phenylalanine ethyl ester hydrochloride. This mixture is heated at reflux for about 30 minutes and the resulting carbobenzoxyglycyl-DL-phenylalanine ethyl ester recovered by the procedure of Example I.

Example X

Carbobenzoxyglycylanilide is prepared by the procedure of Example IX from 2.09 parts of carbobenzoxyglycine and 0.93 part of aniline.

Example XI

In 70 parts by volume of benzene there is dissolved 2.09 parts of carbobenzoxyglycine and 0.73 part of dichloroethylphosphite followed by 1.78 parts of pyridine and to this solution there is added 2.29 parts of DL-phenylalanine ethyl ester hydrochloride. This mixture is heated at reflux for about 30 minutes and the resulting carbobenzoxyglycyl-DL-phenylalanine ethyl ester recovered by the procedure of Example I.

Example XII

In 50 parts by volume of benzene there is dissolved 2.99 parts of carbobenzoxy-DL-phenylalanine and 0.73 part of dichloroethylphosphite and to this solution there is added 1.01 parts of triethylamine, 1.13 parts of N-ethylpiperidine and 1.39 parts of glycine ethyl ester. This mixture is heated at reflux for about 30 minutes and the resulting carbobenzoxy-DL-phenylalanylglycine ethyl ester is recovered by the procedure of Example I.

Example XIII

In 50 parts by volume of benzene there is dissolved 0.93 parts of aniline and 1.01 parts of triethylamine and to this solution there is added 0.73 part of dichloroethylphosphite. A slightly exothermic reaction occurs and the resulting precipitate of triethylamine hydrochloride is removed by filtration. To the filtered solution there is added 2.09 parts of carbobenzoxyglycine and this mixture is heated at reflux for about 15 minutes. The resulting carbobenzoxyglycylanilide is recovered as in Example I.

Example XIV

Carbobenzoxyglycyl-L-tyrosine ethyl ester is prepared by the procedure of Example XIII from 2.09 parts of carbobenzoxyglycine and 2.09 parts of L-tyrosine ethyl ester.

Example XV

In 50 parts by volume of benzene there is dissolved 2.29 parts of DL-phenylalanine ethyl ester hydrochloride and 4.52 parts of N-ethylpiperidine and to this solution there is added 0.73 part of dichloroethylphosphite followed by 2.09 parts of carbobenzoxyglycine. This mixture is heated at reflux for about 30 minutes and the resulting carbobenzoxyglycyl-DL-phenylalanine ethyl ester is recovered and purified by the procedure of Example I.

Example XVI

In 55 parts by volume of benzene there is dissolved 1.95 parts of L-leucine ethyl ester and 3.4 parts of N-ethylpiperidine and to this solution there is added 0.73 part of dichloroethylphosphite followed by 2.05 parts of phthalylglycine. This mixture is heated at reflux for about 30 minutes and the resulting phthalyl-glycyl-L-leucine ethyl ester is recovered by the procedure of Example I.

Example XVII

Carbobenzoxy-L-leucylglycine ethyl ester is prepared by the procedure of Example XVI from 1.39 parts of glycine ethyl ester hydrochloride and 2.65 parts of carbobenzoxy-L-leucine except that only 35 parts by volume of benzene solvent is employed.

Example XVIII

Carbobenzoxyglycyl-DL-phenylalanylglycine ethyl ester is prepared by the procedure of Example XVII from 1.39 parts of glycine ethyl ester hydrochloride and 3.56 parts of carbobenzoxyglycyl-DL-phenylalanine.

Example XIX

To 35 parts by volume of benzene there is added 2.05 parts of phthalylglycine, 1.95 parts of L-leucine ethyl ester and 3.39 parts of N-ethylpiperidine. To the resulting suspension there is added 0.73 part of dichloroethylphosphite and this mixture is heated at reflux for about 30 minutes. The resulting phthalylglycyl-L-leucine ethyl ester is isolated and purified by the procedure employed in Example I for the isolation and purification of carbobenzoxyglycylanilide.

Example XX

Carbobenzoxyglycyl-DL-phenylalanylglycine ethyl ester is prepared by the procedure of Example XIX from 3.56 parts of carbobenzoxyglycyl-DL-phenylalanine and 1.39 parts of glycine ethyl ester.

Example XXI

To a suspension of 2.05 parts of phthalylglycine and 1.95 parts of L-leucine ethyl ester in 35 parts by volume of benzene there is added 0.73 part of dichloroethylphosphite and this mixture is heated at reflux for about 30 minutes. The resulting phthalylglycyl-L-leucine ethyl ester is recovered by the procedure of Example I.

Example XXII

Carbobenzoxyglycylglycine ethyl ester is prepared by the procedure of Example XXI from 2.09 parts of carbobenzoxyglycine and 1.39 parts of glycine ethyl ester.

Example XXIII

To a mixture of 2.09 parts of carbobenzoxyglycine, 0.93 part of aniline and 1.01 parts of triethylamine in 35 parts by volume of benzene there is added 0.87 part of dichlorophenylphosphite and this mixture heated at reflux for about 30 minutes. The resulting carbobenzoxyglycylanilide is recovered and purified as in Example I.

We claim:

1. A method of preparing substituted amides which comprises reacting together a dihalophosphite of the formula:

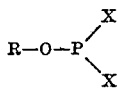

in which R represents a hydrocarbon radical having not more than 6 carbon atoms and X represents halogen, a compound having a carboxyl group capable of being amidated and a compound having an amino group capable of being acylated.

2. The process of claim 1 in which said compound having a carboxyl group capable of being amidated is first reacted with said dihalophosphite and this reaction product then reacted with said compound having an amino group capable of being acylated.

3. The process of claim 1 in which said compound having an amino group capable of being acylated is first reacted with said dihalophosphite and the resulting reaction product then reacted with a compound having a carboxyl group capable of being amidated.

4. A method of preparing substituted amides which comprises reacting a dihalophosphite of the formula:

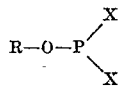

in which R represents a hydrocarbon radical having not more than 6 carbon atoms and X represents halogen with a mixture formed from a compound having a carboxyl group capable of being amidated and a compound having an amino group capable of being acylated.

5. A method of preparing substituted amides which comprises reacting together dichloroethylphosphite, a compound having a carboxyl group capable of being amidated and a compound having an amino group capable of being acylated.

6. A method of preparing substituted amides which comprises reacting together a dihalophosphite of the formula:

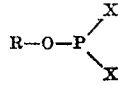

in which R represents a hydrocarbon radical having not more than 6 carbon atoms and X represents halogen, an N-acylated aminoacid, and a compound having an amino group capable of being acylated.

7. The method of claim 6 wherein said compound having an amino group capable of being acylated is an aminoacid ester.

8. The method of claim 6 wherein said compound having an amino group capable of being acylated is a peptide ester.

9. The method of claim 6 wherein said N-acylated aminoacid is an N-acylated peptide acid.

10. A method of preparing carbobenzoxyglycyl-DL-phenylalanine ethyl ester which comprises reacting together carbobenzoxyglycine, DL-phenylalanine ethyl ester and dichloroethylphosphite.

11. A method of preparing carbobenzoxyglycyl-L-tyrosine ethyl ester which comprises reacting together carbobenzoxyglycine, L-tyrosine ethyl ester and dichloroethylphosphite.

12. A method of preparing carbobenzoxy-L-leucylglycylglycine ethyl ester which comprises reacting together carbobenzoxy-L-leucine, glycylglycine ethyl ester, and dichloroethylphosphite.

13. A method of preparing carbobenzoxyglycyl-DL-phenylalanylglycine ethyl ester which comprises reacting together carbobenzoxyglycyl-DL-phenylalanine, glycine ethyl ester, and dichloroethylphosphite.

14. A method of preparing carbobenzoxy-L-leucylglycine ethyl ester which comprises reacting together carbobenzoxy-L-leucine, glycine ethyl ester, and dichloroethylphosphite.

15. The method of claim 13 wherein said carbobenzoxyglycyl-DL-phenylalanine is first reacted with said dichloroethylphosphite and the resulting product then reacted with said glycine ethyl ester.

References Cited in the file of this patent

Anderson et al., J. Am. Chem. Soc., vol. 73, pp. 501–2 (1951).